United States Patent [19]

Elabd

[11] Patent Number: 5,272,535
[45] Date of Patent: Dec. 21, 1993

[54] IMAGE SENSOR WITH EXPOSURE CONTROL, SELECTABLE INTERLACED, PSEUDO INTERLACED OR NON-INTERLACED READOUT AND VIDEO COMPRESSION

[75] Inventor: Hammam Elabd, Sunnyvale, Calif.

[73] Assignee: Loral Fairchild Corporation, Syosset, N.Y.

[21] Appl. No.: 715,154

[22] Filed: Jun. 13, 1991

[51] Int. Cl.⁵ .................. H04N 3/14; H04N 5/335
[52] U.S. Cl. .................. 358/213.11; 358/213.22; 358/213.19; 358/213.29; 358/133
[58] Field of Search .............. 358/213.11, 213.13, 358/213.26, 213.27, 213.19, 213.22

[56] References Cited

U.S. PATENT DOCUMENTS

| | | | |
|---|---|---|---|
| 4,245,164 | 1/1981 | Funahashi | 307/221 |
| 4,580,168 | 4/1986 | Levine | 358/213 |
| 4,758,895 | 7/1988 | Elabd | 358/213.26 |
| 4,803,710 | 2/1989 | Elabd | 377/60 |
| 4,897,728 | 1/1990 | Yamada | 358/213.23 |
| 5,040,057 | 8/1991 | Gilblom et al. | 358/101 |
| 5,097,339 | 3/1992 | Ishida et al. | 358/213.19 |

Primary Examiner—Joseph Mancuso
Assistant Examiner—Joseph Colaianni
Attorney, Agent, or Firm—Townsend and Townsend Khourie and Crew

[57] ABSTRACT

The present invention is an integrated imaging device capable of providing preprocessed images. An image processing unit receives command and control signals to perform selected image or signal processing operations before outputting the image. The imaging array uses either a full or linear array of photodetectors to capture an image of pixel charges. A plurality of pixel storage registers store the pixel charges and allow internal signal processing before transferring the image via an output register to an outside receiving device. A transfer register allows for transferring the pixel charges to a frame storage register. A dump drain permits is included for dumping unwanted data before transfer to the frame storage register. The array uses Si detectors or platinum silicide (PtSi) Schottky barrier detectors (or both) and is capable of both infrared and visual imaging.

23 Claims, 7 Drawing Sheets

IMAGE SENSOR WITH EXPOSURE CONTROL, SELECTABLE INTERLACED, PSEUDO INTERLACED OR NON-INTERLACED READOUT AND VIDEO COMPRESSION

BACKGROUND OF THE INVENTION

The present invention relates generally to imaging devices. More particularly, the invention is directed to an integrated imaging device having a charge-coupled device (CCD) imager array, an image processing unit, and on-chip charge drains and storage registers that provide exposure control of the image data, field interlacing, pseudo interlacing or non-interlacing capabilities, and video compression.

Imaging devices are useful for electronically reproducing a field of view. Once the image is converted into an electrical signal, the image can be enhanced or altered using various forms of signal processing such as spatial filtering, noise suppression, and video compression. Normally, signal processing is controlled by discrete circuitry or software after collecting and passing image data into and then from the imaging device. Select CCD imagers allow for limited, on-chip signal processing capabilities such as spatial filtering or image interlacing.

Generally, transferring an image from the imaging array is through a transfer register. The transfer register is approximately the same width as a row of the imaging array. A group of vertical registers are used to transfer an image, one row at a time, from the imaging array into the transfer register. A charge dump drain removes or dumps unwanted data during this transfer. Using the dump drain to remove image lines one frame of data, while retaining others (window). This is one method for data reduction for the image. This data reduction is useful in an application such as tracking a moving object in the image.

The addition of the dump drain provides for quicker spatial filtering processing than previously possible since the dump drain performs the processing simultaneously with the image transferring operation. This increases the overall image processing speed and reduces the need for additional circuitry to perform the specific signal processing function. However, the addition of the dump drain provides only limited signal processing or data manipulation capabilities. Other processing functions that do not require or use the dump drain still limit the speed of the imaging system. This causes additional problems such as delay, or requires additional discrete processing circuitry that is expensive. Also, the transfer register is limited in what types of processing can be done since usually only a single channel is provided.

A temporary storage register, generally of the same size as the imaging array, may be added to an imaging device to perform image interlacing. A first field image of alternating rows or columns stored in the storage register is combined with a second field image having alternating rows or columns lacking in the first field image. The resulting field is an interlaced image having a higher resolution than either the first or second field image alone. Yet, most imaging arrays are limited to doing only one or two signal processing or image manipulation functions such as image interlacing, non-interlacing, windowing or other type functions.

From the above, it is seen that an improved imaging device and an associated charge transfer apparatus is desired that is capable of performing a variety of signal processing and image manipulation functions, such as image compression, Fourier transform, spatial filtering among others.

SUMMARY OF THE INVENTION

The present invention discloses an imaging device capable of performing asynchronous internal image preprocessing. One embodiment of the imaging device comprises an imaging array having a plurality of photodetectors arranged in rows and columns that are used to detect an image. A plurality of charge storage registers, each coupled to at least one photodetector, are included to store a pixel charge detected by the photodetectors. A transfer register is connected to each column of photodetectors and transfers the stored pixel charges. An image processing unit, coupled to the transfer register, performs image signal processing functions on the pixel charges. The transfer register comprises a first channel and a second channel. Each of the first and second channels is connected to the pixel storage registers in adjacent columns. The first channel provides pixel charge serial addressing and transfer, and the second channel provides pixel charge delay, summation, and storage capabilities. A third channel also may be provided to store other frames of data or data obtained by short exposures or it may contain Fourier transform coefficient programmed in a metal mask layer.

A first output port, coupled to the transfer register and to the image processing unit, ports asynchronously an image signal processed asynchronous to the image received by the photodetectors. Also, a second output port, coupled to the transfer register and to the image processing unit, ports an unprocessed image signal synchronous with the image detected by the imaging device. This allows the imaging device to output either synchronous or asynchronous signals, or both. The asynchronous porting ability allows the device to be RS170 compatible. In addition, the image processing unit may select to output either interlaced, pseudo interlaced or non-interlaced images. A dump drain register, coupled between the imaging array and one of the output ports, also may be provided to drain off unwanted charges during various signal processing functions.

The signal processing capabilities of the imaging device is increased by including frame storage register coupled between the imaging array and one of the output ports. The frame storage register is sufficiently large to store enough pixel charges to form a full frame of an image. The imaging device optionally includes a cryostat or a thermo electric cooler to cool the imaging device below ambient temperature. Other embodiments contemplate using a linear array in the place of the full array. The photodetectors detect, for example, in the infrared or visual, or both, and are Schottky barrier diodes in one embodiment. The imaging device, in one embodiment, is controlled by an outside computer that sends command and control signals to the image processing unit.

DESCRIPTION OF THE PREFERRED EMBODIMENT

Figure 1A:
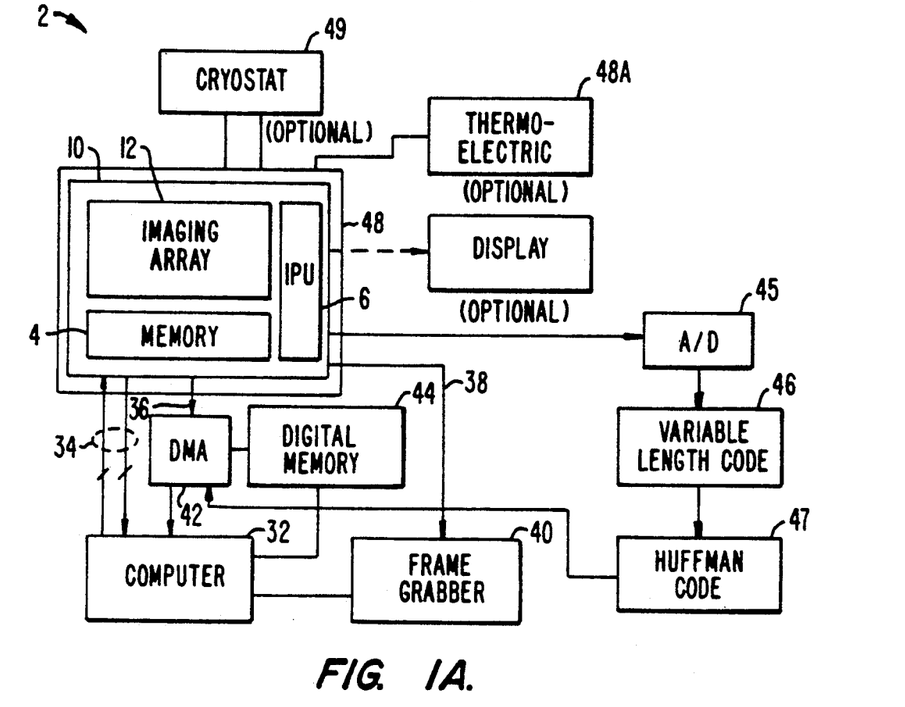
FIG. 1a is a block diagram of an imaging system using an imaging device according to the present invention.

FIG. 1a is a diagram of an imaging system 2 using an integrated imaging device 10. The imaging device includes an imaging array 12, an analog memory 4, and an image processing unit (IPU) 6, preferably on a single chip. Imaging device 10 has an input port and various output ports that allow the device to process image data in real time before outputting the data to an off chip device such as a computer, a memory storage unit, or a video display monitor. The input port receives command and control instructions from a computer to direct image processing unit 6 to process the image data as desired. The image processing unit also sends the image data to the proper output port. At least one output port is dedicated to outputting unprocessed data at a high rate of transfer for real time viewing or storage. Another output port is dedicated to outputting processed data at a slower rate of transfer and on demand compatible with a computer bus interface.

Imaging device 10 performs several processing functions according to one embodiment. One such processing function is time delay integration (TDI). TDI obtains freedom from blurring on certain types of relative motion between the imager platform and the position of the image to which the imager generates photoresponse. TDI allows for longer photocharge collection times for improved sensitivity. Other processing functions include image precompression, Fourier transform, variable time data integration, serial pixel averaging, and vertical and horizontal spatial filtering.

Figure 2:
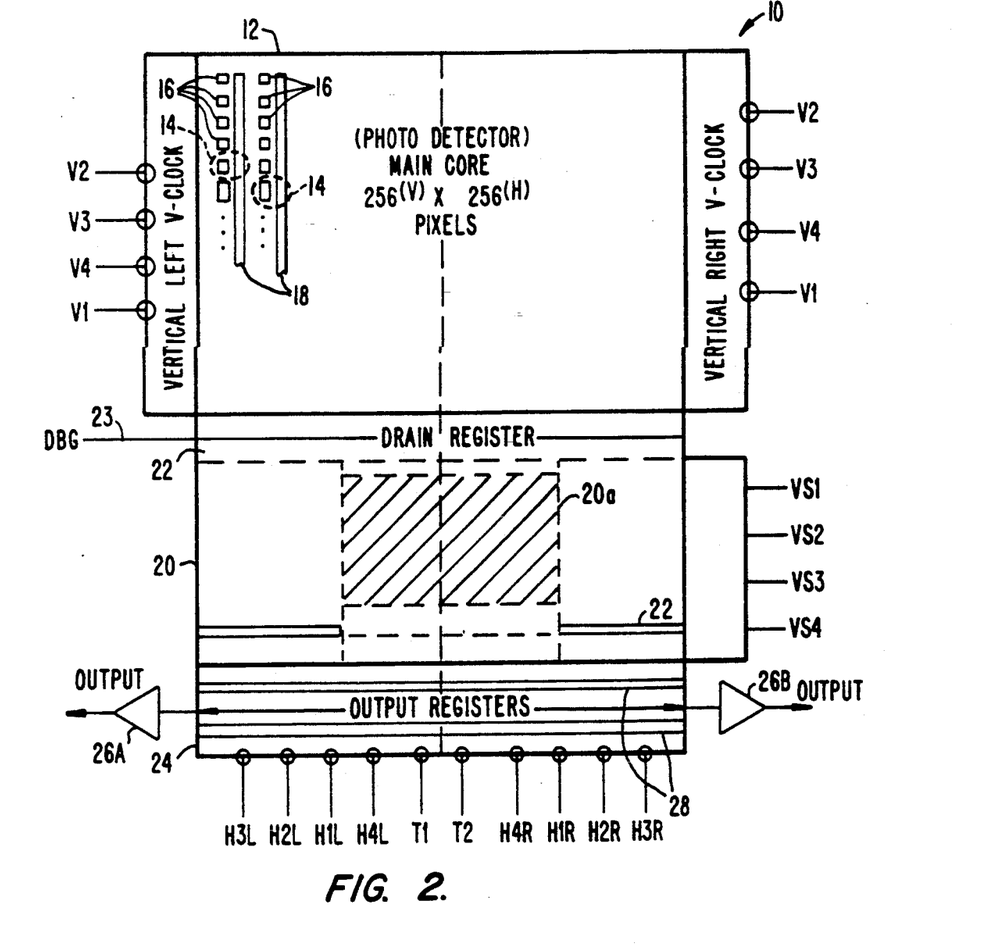
FIG. 2 is a diagram illustrating an imaging device embodied in of the present invention.

FIG. 2 is a diagram of imaging device 10 according to the present invention. The imaging device is on a single die and has a conventional high definition image register or array 12. The image array is made of charged coupled device (CCD) imagers capable of registering both IR and visual images. Array 12 contains N columns of sensor cells 14. Each cell 14 includes a photodiode 16, a transfer gate (not shown), and a vertical CCD register 18. The image array 12 registers and records a full frame of image data before transferring the data to frame storage register 20 via vertical registers 18. Storage register 20 is an analog memory array, preferably having the same number of memory cells as there are sensor cells 14 in array 12. Storage register 20 also has an image window 20a, preferably those registers which store the center square area from imaging array 12, that is used to process a particular area of interest within a given image. Dump drain 22 disposes of unwanted data before the transfer of the remaining data. A drain barrier gate (DBG) line 23 is used to activate dump drain 22.

The imaging device may use a linear array of sensor cells 14, or one row of cells, rather than a full image array 12 of rows and columns of cells. This is suitable for processing scanned images such as in facsimile machines or document scanners.

The image data held in frame storage register 20 are preferably manipulated and processed before output register 24 transfers the data out of imaging device 10. The output register 24 may use first and second output ports 26A and 26B, respectively, or just a single output port (not shown), during the data transfer. Output register 24 also uses horizontal CCD registers 28 for transferring image data through output ports 26A and 26B to storage, processing, display, or any combination of the three. In one embodiment, an output port is used to transfer data in real time, or at a rate equal to that at which the data is received by the imaging array. Another output port is used to transfer data at a rate slower than, or asynchronously with, that at which the data is received. The asynchronous transfer capability allows the data to be internally processed before being outputted.

The imaging device is capable of generating a non-interlaced image. For example, the imaging array scans and stores an image half a frame at a time by alternating between accumulating all even rows or all odd rows. A first field of one type of rows is stored in the bottom half of storage register 20. A second field of the other type of rows is then stored in the top half of storage register 20, or the two fields is stored in any other scheme desired. The two fields in the storage register are then outputted together forming a non-interlaced image. Because the storage register is loaded one line at a time, it requires less than 100 microseconds to write a frame. Therefore, there is only a very short time lag or delay between the two fields. Motion artifacts of interlace imagery will therefore disappear and the image edges will be very sharp.

The imaging device generates a full image of an observed object merely by taking a difference between successive images stored in the register and performing DCT (discrete cosine transform) on the difference image before outputting in one embodiment. The storage register design allows the storage of the DCT coefficients on a metal mask aperture of an illuminated storage register. Analog multiplication and summation logic circuits are used to prepare the data for digital coding for compression. The imaging apparatus can process up to 400 images per second, and the difference between two images is much smaller and more easily compressed than a full image. This allows faster processing speeds since less information is actually processed. An application of this provides for an outline of a moving object to be formed. This is possible since only the pixels forming the moving object appear in the difference between successive frames. The outline information is then used to highlight the moving object or generate a representation of the object on a video monitor without requiring full successive frames of the object. Furthermore, a full frame of asynchronous data are used with the difference data to generate a current image based on extrapolation from a previous complete image using the difference data. This allows for near real time viewing of an object without full real time processing. This also allows for motion prediction and processing.

Figure 1B:
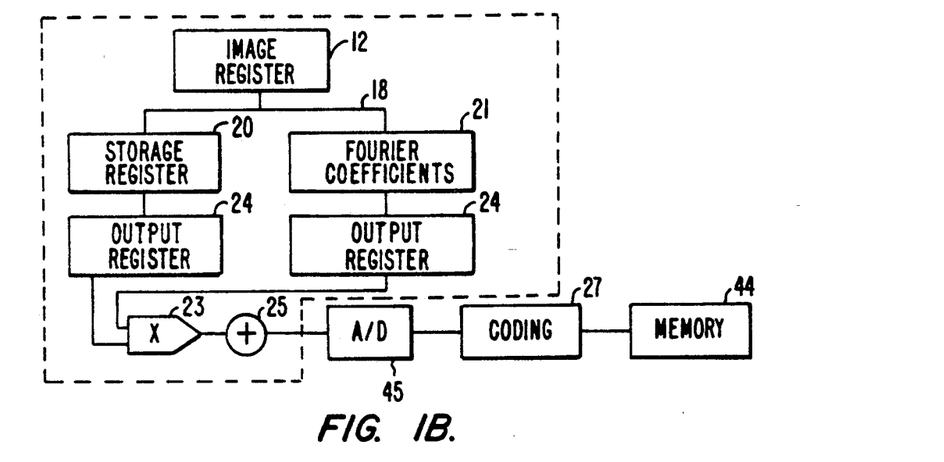
FIG. 1b is a block diagram of an application of the imaging device.

Similar applications are performed with spatial frequency, Fourier transform, or coordinate frame in some embodiments. By example, and as shown in FIG. 1b, Fourier coefficient 21 is stored on the metal mask layer of an illuminated storage register and used to multiply with the stored pixel data using analog multiplier 23 and summation 25 that is integrated on the same chip as the imaging device or is discrete circuitry, or a combination of both. The output data are sequenced in a way optimum for coding 27, e.g., variable length code and Huffman code, after digital conversion 45. A suitable compression method for compressing image data is either the Joint Photographic Experts Group (JPEG) or the Motion Picture Experts Group (MPEG), both of which are well known to those skilled in the art.

Referring back to FIG. 1a, imaging system 2 uses a computer 32, such as an IBM-compatible personal computer (PC), to perform such functions as triggering exposure control or resolution control, or both, and operating the image processing unit on imaging device 10. Imaging device 10 couples with computer 32 via a digital input/output interface bus 34 and a compressed image interface 36. In some embodiments, computer 32 sends the image signal to a mass memory (not shown), i.e., a hard disk, directly from imaging device 10 for display or further processing in a computer 32, or both. Compressed image data, from a 100:1 to up to a 200:1 compressed to uncompressed ratio (averaged over many frames), allows for a slower transfer rate over connector 38 that is, for example, RS 170 compatible. A digital memory, or frame grabber 40, may be used by computer 32 during this type of transfer. A suitable frame grabber is available from either Matrox Corp. or I.T.I. Imaging Technology. Direct memory access (DMA) bus 42 also may be used to transfer the compressed image data to the computer or to digital memory 44 when desired, or to a modem for communication to other computers. In order to provide compressed data, the signal is outputted to analog to digital (A/D) converter 45. After the signal is converted to digital form, it is then compressed via either variable length code compression 46 or Hoffman code compressor 47 before inputting to DMA 34.

The analog memory allows real-time image porting since a full frame can be loaded in about 50 to 200 μsec. The frame grabber ports a full frame of digital information in about 30 millisec. This is so since each frame has about 0.25 to 0.4 million pixels of digital information and it takes about 100 nanoseconds to transfer or store each pixel. The slower digital transfer rate also allows RS 170 compatibility with other devices when under exposure control mode of operation.

One image frame may take about 33 millisec to readout. This equals the photon integration time plus the time to dump unwanted photocharge. The imaging device exposure control function can take a glimpse of an image any time during a portion of the 33 millisec (down to 100 μsec per glimpse) and store that image in the analog storage register for later transfer out of the device. The remainder of the integrated charge is dumped in the vertical drains. This image glimpse may be used to observe the details of fast moving objects.

Imaging device 10 mounts in a dewar 48 or on a thermoelectric cooler 48A. Dewar 48 includes a Stirling cycle refrigerator and a J/T cryostat 49 for cooling the imaging device to a desired cryogenic temperature. The preferred temperature range is between 75° K. to 79° K. for PtSi focal plane array (FPA). The lower temperature cools the memory units of imaging device 10 for optimal performance by reducing dark current collected in the image and storage registers. The cryogenic temperature also lowers the noise and increases operating speed beyond that possible at normal ambient temperatures. The dark current drops by a factor of two (2) in silicon every 8° C. below room temperature (about 20° C.).

Figure 3:
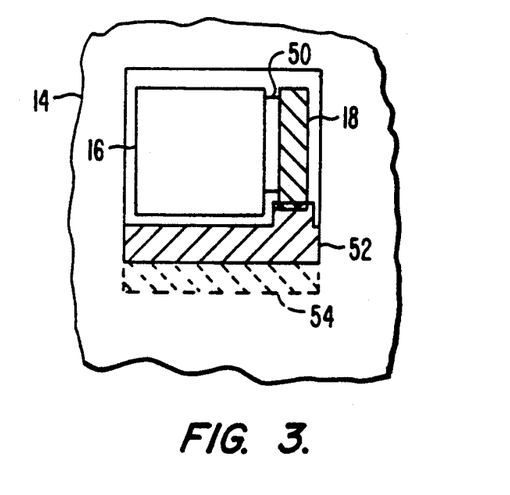
FIG. 3 is a diagram illustrating the cell from the imaging device of FIG. 2.

FIG. 3 is a diagram showing cell 14. Photodiode 16 couples to vertical register 18 through transfer gate 50. Ideally, photodiode 16 is a platinum silicide (PtSi) Schottky barrier diode (SBD), capable of detecting in the infrared (IR) range, or a Si detector working in the visual red, green, and blue (RGB) ranges to detect color images. The added capability of color imaging allows the imaging device to perform a unique processing function of multi-spectral fusion. Other types of photodetectors that may be used include silicon MIS, junction diodes, and junction gate detectors. Each cell 14 contains an analog storage register 52 capable of storing at least one pixel of accumulated charge (or two pixels when using optional second storage register 54).

The size of the photodiode/storage register is from about 50 to 900 square microns ($\mu m^2$). The photodiode occupies about 20 to 50% of the pixel and the storage register occupies between about 20 to 40% of the pixel. Since the storage register is much smaller than the photodiode, the impact on chip size due to the addition of the storage register is reasonable. The charge movement from the image register to the storage register can be done in one, two, three, or four or more fields. Thus, the charge handling capacity required in the image register/pixel is reduced without blooming. Each detector can be readout in several vertical pixel locations. The resulting array has a high pixel fill factor. Thus during sequential readout, vertical alliasing low fill factor caused by high frequency scenes is reduced. Alliasing is when a fine pattern is under sampled spatially. This architecture allows the design of image sensors with very large charge handling capacity (several million electrons), since the storage register can be made as large as required without affecting the detector modulation transfer function.

Figure 4A:
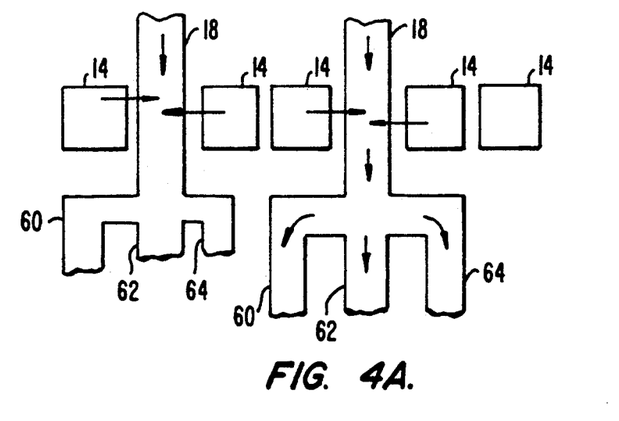
FIGS. 4a-h show the channel layout of the cell of the imaging device of FIG. 2, the block diagram of the asynchronous sensor, and the modes of data readout.
Figure 4B:
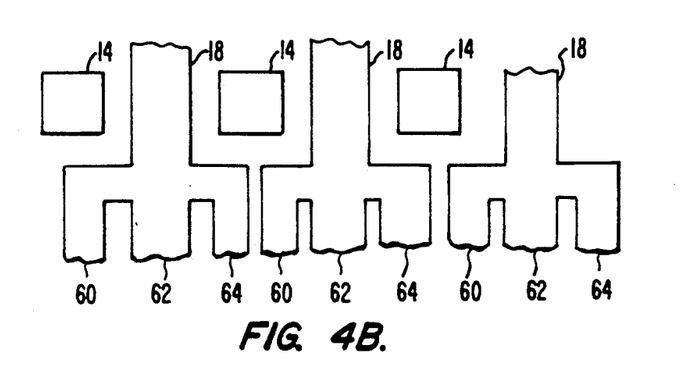
Figure 4C:
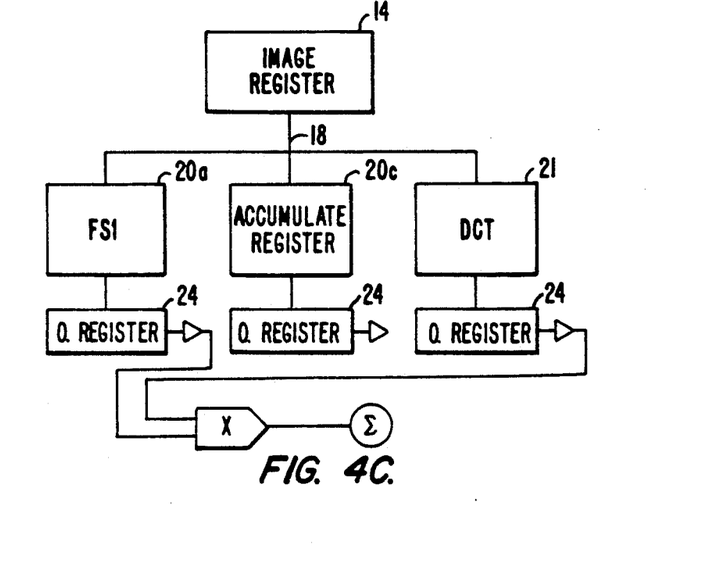
Figure 4D:
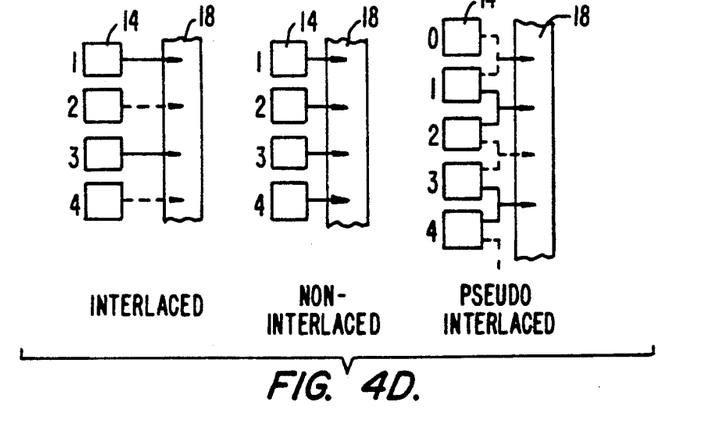

The storage register provided within each cell allows a wide range of data manipulation capabilities. Charge binning, the combining of charge from adjacent storage registers (vertical and horizontal spatial filtering), are accomplished for compression of the image in some embodiments. Alternatively, or in addition, spatial filtering is performed by selecting pixels for deletion in the storage register through the dump drain, or by performing pseudo interlace readout as shown in FIG. 4d. This is useful for looking at moving objects. In addition, the storage register also allows the imaging device to operate in either an interlaced, pseudo interlaced or sequential readout mode.

Sequential readout, also known as non-interlaced, improves visual perception of an image displayed on a video monitor by removing edge distortion interline flicker and field-to-field flicker noise. The sequential readout mode is discussed below. The imaging device of the present invention has further applications such as micropositioning, alignment (because of the frame difference feature), viewing objects on a moving conveyor belt, and high speed cameras (because of the exposure control feature).

In one embodiment, each column of the vertical register 18 outputs to one of three storage registers 60, 62 and 64. FIG. 4a illustrates one vertical register 18 having a first or left storage channel 60, a second or center control channel 62, and a third or right control channel 64. Channels 60, 62, and 64 run in parallel and have a detector cell 14 on either side in an asymmetrical detector layout. The storage registers and channels 60, 62, and 64 may be fabricated with triple polycrystalline silicon (polysilicon) gates. For example, register 60 transfers data for later processing (delay), summation, or storage. Register 62 is a second frame store used to perform the image difference function. Register 64 stores the Fourier transform coefficients. FIG. 4b is the same as FIG. 4a except it is representative of a symmetrical detector layout where only one column of detectors 14 dump in register 18.

Figure 4E:
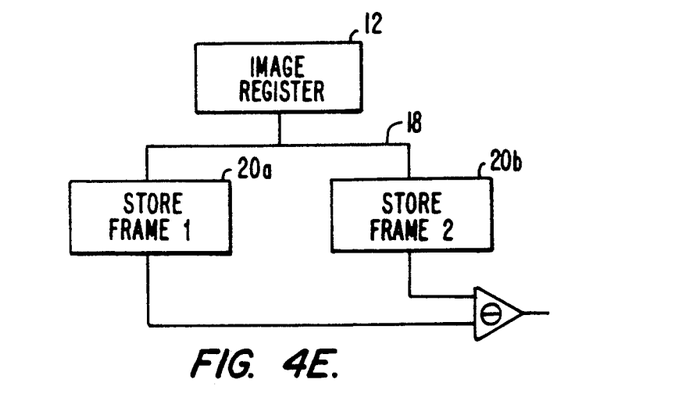
Figure 4F:
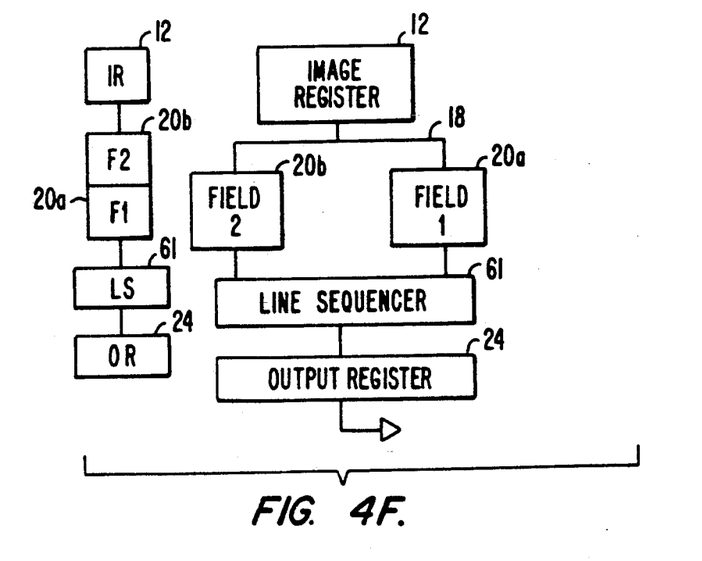
Figure 4G:
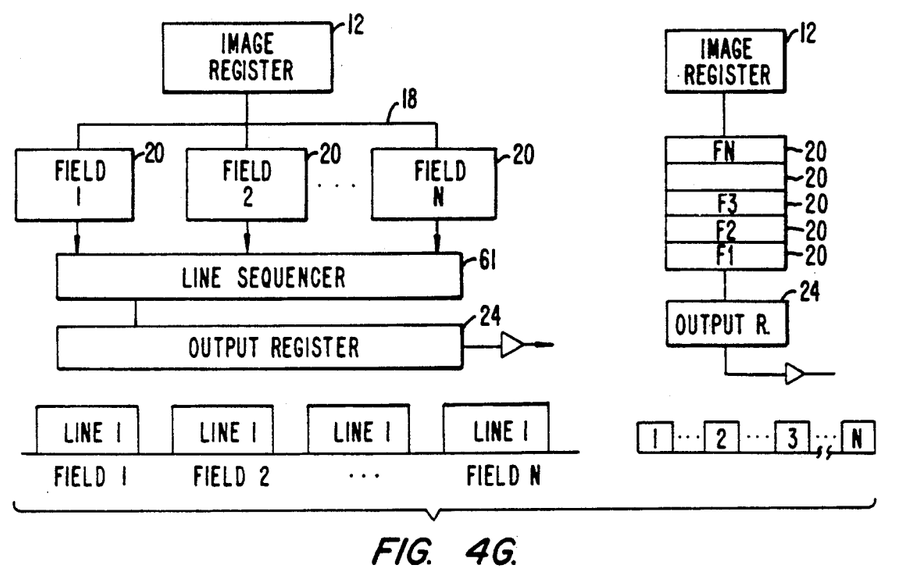
Figure 4H:
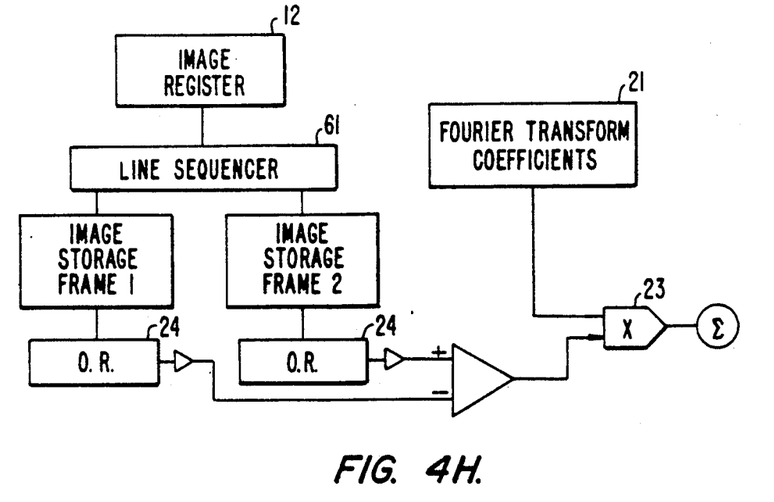

Each channel is selected according to the desired function as controlled by the on-chip image processing unit based on the commands received from the computer. For example, charge may be retained in a register while charge from the next line in the image is clocked in. Charges may then be combined from the two adjacent lines. Other examples include the following: an accumulation register 20c is used to add several frames to improve SNR and then combined with DCT function 25 is shown in FIG. 4c; the interlacing, non-interlacing, and pseudo-interlacing operations are illustrated in FIG. 4d where the interlaced operation takes charges from alternating detector cells, the non-interlaced operation sequentially takes charges from each detector cell, and the pseudo-interlacing operation takes charges from adjacent detector cells; the image difference function shown in FIG. 4e where the image stored in store frame one 20a is subtracted from the image stored in store frame two 20b; FIG. 4f shows a parallel field storage arrangement, with its conjugate serial field storage arrangement, used to resequence lines in sequence to avoid field delay after storage, the external memory 44 shown in FIG. 1a is used for the resequencing step(s); the function of n:1 field interlace of FIG. 4g where the interlace can be done either serially or in parallel as shown by the field stores 20 numbered from 1 to N, in the parallel interlacing, a line sequencer 61 is used to transfer the image by proper line order, before being outputted through output register 24; and, DCT function of JPEG/MPEG compression of FIG. 4h where a difference is taking between two image storage frames 20a and 20b with the result being operated on by Fourier transform coefficients 21. One alternative embodiment uses only two channels instead of three channels. Another embodiment may use four, five, or more channels.

One embodiment of the present invention contemplates the field of the imaging array to be 256×256 pixels. Furthermore, the device may be operated in at least three modes. The first mode is a full frame mode that operates at a frequency of either 30 frames/second or 150 frames/second. With a horizontal clock rate of less than 6.7 megaHertz (MHz), the data rate in this mode is 9.83 million pixels per second (Mp/s). In the system using two output ports, this corresponds to 4.92 Mp/s per port. At the end of the integration time, the charge is transferred from the storage registers to the frame storage register. This allows the charge to be transferred one field at a time. In the non-interlaced readout, the time difference between transferring the first and second field is 50 to 500 μseconds, and preferably, about 100 μseconds. With conventional interlaced imagers, the time difference between reading the first and second fields is one half the frame integration time. The non-interlaced mode removes edge distortion from the image of moving targets and reduces the spatial uncertainty of the target location due to the sampling time difference.

The second mode uses a 64×64 pixel subframe of the imaging array. With the above horizontal clock rate the data rate in this mode is 1.64 Mp/s, or 0.82 Mp/port. This mode allows the system to update a scene at 400 frames/second. The subframe is created by dumping complete or partial lines of video in a two stage drain register located between the imaging array and the frame storage register. Another drain register exists between the storage register and output register to clear unwanted image that may be in storage. Preferably, the subframe consists of those cells located in the center of the imaging array.

The third mode is an exposure control mode having an RSI70 compatible output and resets the array twice per field. The first reset empties the array of unwanted charge by dumping it through the dump register. The second reset integrates the photon flux interval for a very short interval and stores it in the frame storage register. The two fields are used to produce an image integrated during a short exposure. To do that the reset signals of the detectors in the two fields are separated by a period equal to the time required to move the image of one field from the imaging array (the vertical register) to the frame storage register.

The cells in the imaging array allow for a fill factor of between 30% to 90%, with 50% preferred. The advantages of this percentage of fill factor are to be able to operate the array in conventional interlaced mode (2/1), the non-interlaced mode closely interleaving two fields, or to operate the array in pseudo interlace mode without requiring more than 4:1 field interleaving to transfer the summed charge of each two lines of detector charge.

Figure 5:
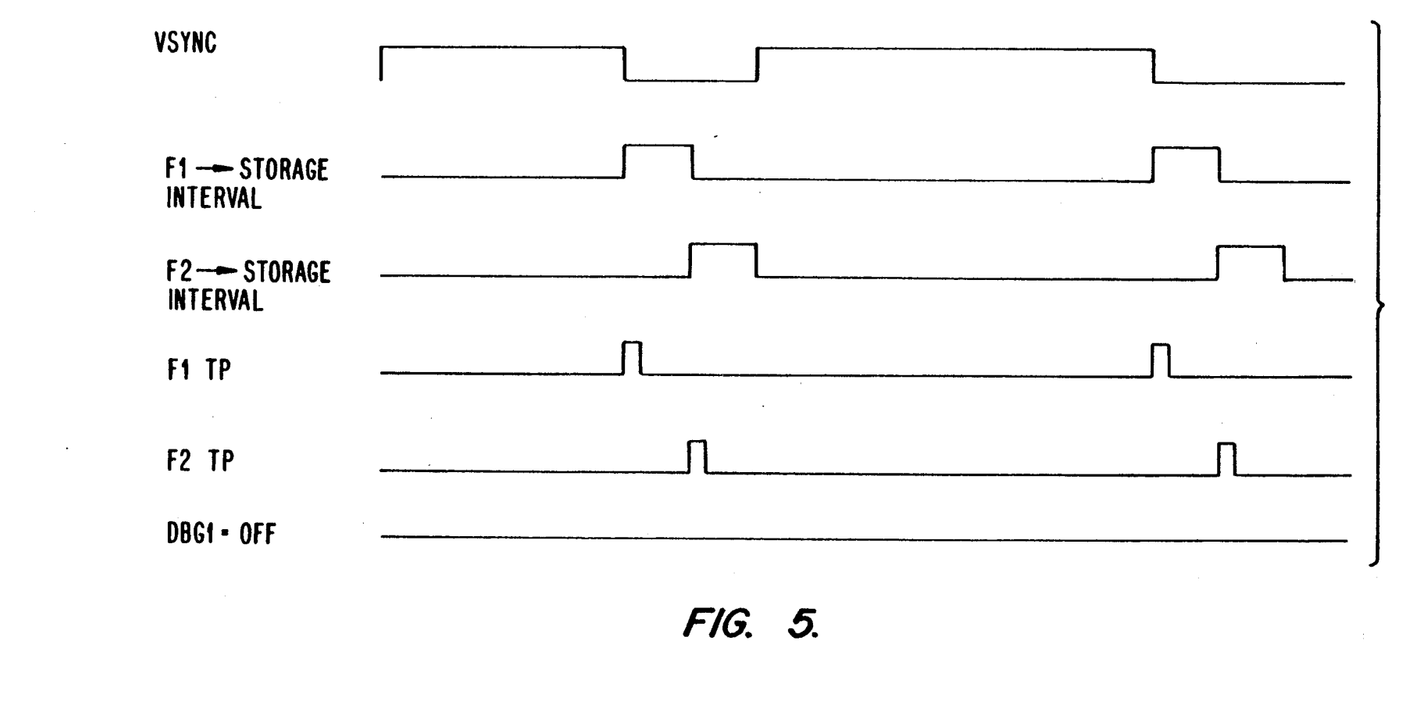
FIG. 5 is a timing diagram showing the timing signals of a vertical transfer register in an embodiment of the present invention.
Figure 6:
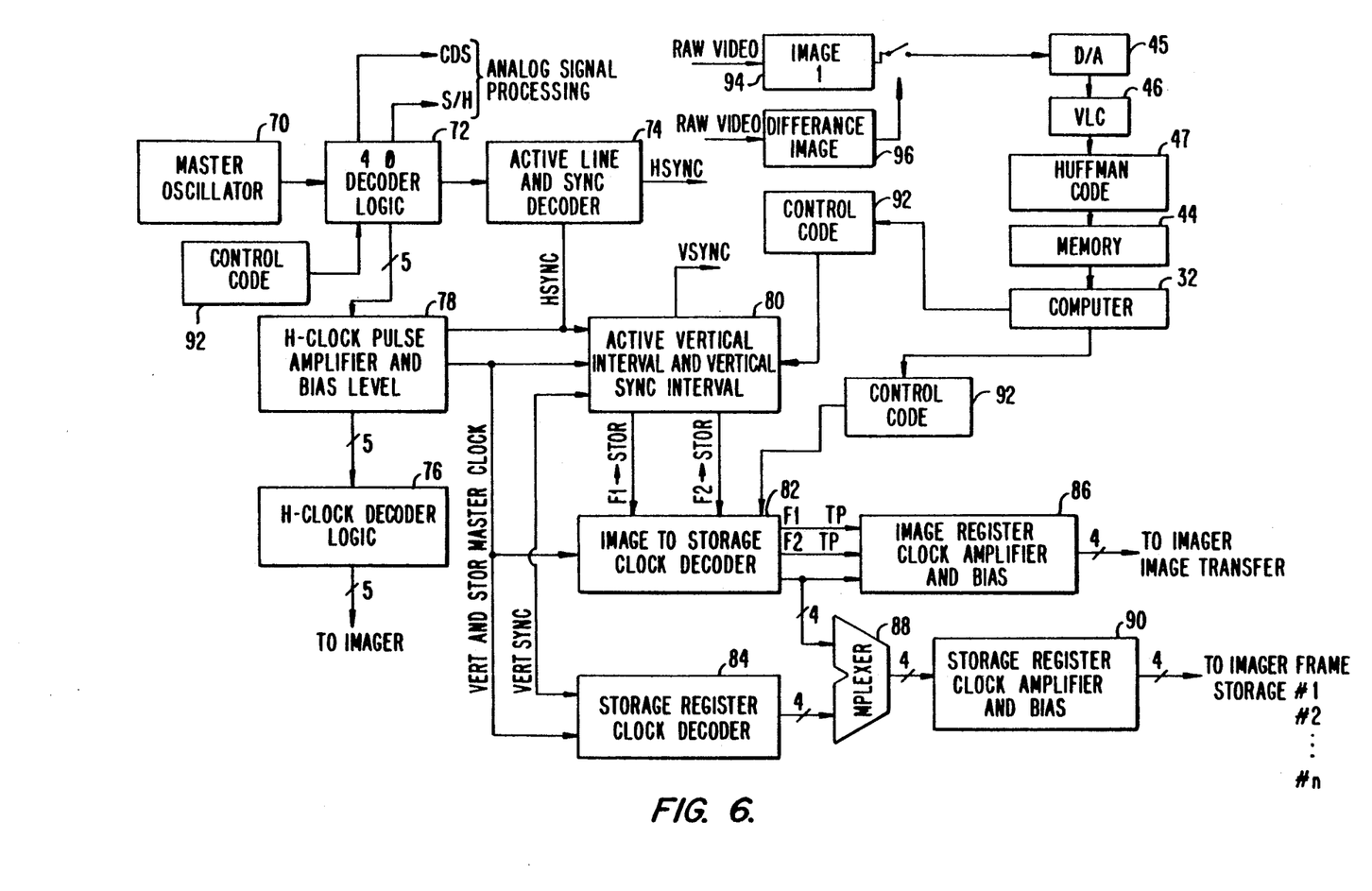
FIG. 6 is a block diagram of a video and timing circuit using the timing signals of FIG. 5 and interfacing to a computer.

FIG. 5 is a diagram showing the basic timing for the full frame or first mode above. FIG. 6 is a block diagram illustrating an electronic embodiment of a full frame circuit 70 using the timing signals shown in FIG. 5. The first signal in FIG. 5 is the 150 Hz vertical synchronizing signal (VSYNC). This signal is a logic one, or high for 244 lines, during the active video time during which the image signal is read out. This signal is a logic zero or low while the signal is transferred from the photodiodes to the vertical CCD and while the signal is transferred from the image area to the frame storage register. During this whole sequence, the drain barrier gate (DBG) is off.

F1 → STORAGE INTERVAL is the time during which the first field (field one) is transferred to the frame storage register. At the beginning of this interval the transfer pulse for field one F1TP is pulsed to load the signal from the field one photodiodes to the CCD vertical transport register. After this, 122 clock pulses are applied to both the storage registers in the imaging array and the frame storage register, thereby transferring the signal from the storage registers to the upper 122 lines of the frame storage register. Afterward, F2TP is pulsed at the beginning of the F2 → STORAGE INTERVAL. This signal loads the second field (field two) photodiodes into the storage registers of the imaging array. Then, another 122 clock pulses are applied to the vertical registers and the frame storage register thereby transferring the signal of field one to the lower 122 lines of the frame storage register while the signal from field two is transferred to the area previously occupied by the signal from field one. The time for each of the transfers takes 509 μseconds making a time difference of 509 μseconds between the field one signal and the field two signal.

With the image now in the frame storage register, the 244 lines are read out sequentially at a rate of 43,200 lines per second and at a pixel rate of 6.9696 MHz. There is a four (4) μsecond interval between the lines to allow the next line to be loaded into the horizontal read out register to allow continuous line by line read out until the frame storage register is empty and the whole process repeats itself.

Master Oscillator 70, in FIG. 6, is set to be eight (8) times the horizontal shift register clock frequency, or 53.568 MHz. Four (4) phase ($\phi$) decoder logic 72 receives the signal from master oscillator 70 and divides the signal by eight to provide four overlapping four phase clock pulses that drive the horizontal CCD registers (H1L-4L and H1R-H4R of FIG. 2). Decoder logic 72 also creates eight time slots that can be used to generate the CCD reset clocks and the correlated double sampling (CDS) pulses and sample and hold (S/H) pulses, which are subsequently sent to the analog signal processor (not shown). One of the phase clock pulses goes to the active line & sync decoder 74, which then produces a 43.2 KHz horizontal synchronizing (HSYNC) signal. A copy of the HSYNC signal goes to H-clock decoder logic 76 thereby introducing an interval into the horizontal clock during which a row from the frame storage register is loaded into the horizontal serial register for read out.

The four phase clock pulses and a reset pulse go to H-clock pulse amplifier and bias level 78, select outputs of which go to the horizontal CCD read out register. In addition, the HSYNC signal also goes to active vertical interval and vertical sync 80. Vertical sync 80 produces the following three signals: VSYNC, F1 → STORAGE, and F2. → STORAGE (see above). Signals F1 → STORAGE, F2 → STORAGE, and VERT. & STOR. MASTER CLOCK are sent to image to storage clock decoder 82. Signals VSYNC and VERT & STOR MASTER CLOCK go to storage register clock decoder 84.

The output of clock decoder 84 goes to image register pulse amplifier and bias circuit 86, the storage register of the imaging array, and to multiplexer (mplexer) 88. Multiplexer 88 allows the vertical transfer register and the frame storage register to be connected during the high speed transfer from the vertical transfer register to the frame storage register, which may be two to n storage registers. When the transfer is completed, multiplexer 88 then switches from the high speed transfer to the frame storage register and to horizontal read out. The output of multiplexer 88 goes to storage register clock amplifiers and bias 90, whose output then drive the storage register clock lines of the vertical CCDs. (V1-4 of FIG. 2)

The code instruction (modes interlaced, non interlaced, and pseudo interlaced) used to control the 4$\phi$ decoder logic 72, active vertical interval and vertical sync interval 80, and usage to storage clock decoder 82 are received from control code 92. The control commands are sent from computer 32, depending on whether a full image from image one (1) 94 or a difference image 96 is used to preprocess the incoming raw image data.

Table 1 provides an illustrative process sequence that may be used in fabrication of a device according to the invention. It will be recognized by those of ordinary skill in the art that this fabrication sequence is merely illustrative of one method of fabricating a device according to the invention. Many of these levels are optional and may be deleted if the amount of signal processing implemented on chip is reduced.

TABLE 1

| Layer | Comments |
| --- | --- |
| 1) field oxide | defines active area |
| 2) channel stop | defines CCD channel |
| 3) N/P-well (optional) | defines CMOS transition areas and vertical overflow drain area |
| 4) buried channel CCD implant (first) | defines the buried channel area |
| 5) second buried channel CCD implant (optional) | defines optional buried channel area |
| 6) poly level 1 | clock phase and transistor gate |
| 7) threshold adjust implant | for depletion or enhancement MOSFETs |
| 8) poly level 2 | clock phase and transistor gate |
| 9) poly level 3 | clock phase and transistor gate |
| 10) N+ source and drain level | |
| 11) P+ source and drain level | |
| 12) contact mask | |
| 13) detector contact mask (optional) | |
| 14) dielectric mask (optional) | |
| 15) metal mask level #1 | for metal interconnects |
| 16) contact mask (optional) | |
| 17) metal mask level #2 (optional) | |
| 18) pad mask | |

In general, to those skilled in the art to which this invention relates, many changes in fabrication and widely differing embodiments and applications of the present invention will suggest themselves without departing from the spirit and scope of the invention. Thus, the disclosures and description herein are purely illustrative and are not intended to be in any sense limiting. The scope of the invention is stated in the appended claims.

What is claimed is:

1. An integrated circuit imaging device capable of performing asynchronous internal image preprocessing, said device comprising:

a plurality of detector cells arranged in rows and columns disposed on an integrated circuit thus forming an imaging array, each said detector cell having a photodetector and at least one pixel storage register coupled to said photodetector, wherein a pixel charge detected by said photodetector is stored in said pixel storage register;

a transfer register connected to each column of detector cells, said transfer register for transferring said pixel charges stored in said charge storage registers;

an image processing unit disposed on said integrated circuit and coupled to said transfer register, said image processing unit for performing image signal processing functions on said pixel charges;

a first output port coupled to said transfer register and to said image processing unit, said first output port for outputting asynchronously an image signal processed within said imaging device from said transfer register under the control of said image processing unit; and a second output port coupled to said transfer register and to said image processing unit for outputting simultaneously with said asynchronous output from said first output port an unprocessed image signal synchronous with the image detected by said imaging device.

2. An imaging device as in claim 1 wherein said image processing unit selects for output an interlaced, non-interlaced image, or pseudo interlaced image, with interlacing of n fields per frame.

3. An imaging device as in claim 1 further comprising a dump drain register coupled between said imaging array and one of said output ports.

4. An imaging device as in claim 1 further comprising a frame storage register coupled between said imaging array and one of said output ports, said frame storage register being capable of storing enough pixel charges to form a full frame of an image.

5. An imaging device as in claim 1 wherein each transfer register comprises a first channel and a second channel, each first and second channel being connected to said detector cells of said column, said first channel for providing pixel charge serial addressing and transfer, and said second channel for providing pixel charge delay, summation, and storage.

6. An image device as in claim 5 wherein each transfer register further comprises a third channel connected to said detector cells of said column, said third column for providing storage of image transform coefficients to be multiplied by corresponding pixels in said pixel storage register to achieve image transform.

7. An imaging device as in claim 5 further comprising a cryostat coupled to said imaging device, said cryostat for cooling said imaging device below ambient temperature, for lowering dark current and noise level for images stored in said pixel storage registers.

8. An imaging device as in claim 7 further comprising a thermoelectric cooler coupled to said imaging device, said thermoelectric cooler for cooling said imaging device below ambient temperature, for lowering dark current and noise level for images stored in said pixel storage registers.

9. An imaging device as in claim 1 wherein said imaging device is RS 170 compatible with one of said output ports being coupled to an output device for receiving image data represented by said pixel charges.

10. An integrated circuit imaging device capable of performing asynchronous internal image preprocessing, said device comprising:
a plurality of detector cells arranged in a row disposed on an integrated circuit thus forming a linear imaging array, each said detector cell having a photodetector and at least one pixel storage register coupled to said photodetector, wherein a pixel charge detected by said photodetector is stored in said pixel storage register;
a transfer register connected to each detector cell of said row, said transfer register for transferring said pixel charges stored in said charge storage registers;
an image processing unit disposed on said integrated circuit and coupled to said transfer register, said image processing unit for performing image signal processing functions on said pixel charges;
a first output port coupled to said transfer register and to said image processing unit, said first output port for outputting asynchronously an image signal processed within said imaging device from said transfer register under the control of said image processing unit; and
a second output port coupled to said transfer register and to said image processing unit for outputting simultaneously with said asynchronous output from said first output port an unprocessed image signal synchronous with the image detected by said imaging device.

11. An imaging device having on-chip analog signal processing comprising:
a plurality of detector cells arranged in rows and columns thus forming an imaging array, each said detector cell having a photodetector and at least one pixel storage register coupled to said photodetector, wherein a pixel charge detected by said photodetector is stored in said pixel storage register;
a transfer register connected to each column of detector cells, said transfer register for transferring said pixel charges stored in said pixel storage registers;
an output register coupled to said imaging array, said output register for receiving said pixel charge from said transfer registers; and
a processing circuit coupled to said transfer register, said processing circuit adapted to perform one of the following functions: analog substraction, addition, and multiplication on said pixel charges before outputting said pixel charges.

12. An imaging device as in claim 11 further comprising a dump drain register coupled between said imaging array and said output register.

13. An imaging device as in claim 12 wherein said dump drain comprises a vertical overflow drain coupled to each pixel register.

14. An imaging device as in claim 11 further comprising a frame storage register coupled between said imaging array and said output register, said frame storage register being capable of storing enough pixel charges to form a full frame of an image.

15. An imaging device as in claim 14 wherein said pixel charges are serially stored as a first and second field in said frame storage register.

16. An imaging device as in claim 14 wherein said pixel charges are stored in parallel as a first and second field in said frame storage register.

17. An imaging device as in claim 11 wherein said photodetectors are selected from the group consisting of platinum silicide (PtSi) Schottky barrier detectors, silicon MIS detectors, junction diodes, and junction gate detectors.

18. An imaging device as in claim 11 wherein said detector cells further comprise a second pixel storage register, each pixel storage register being coupled to said photodetector and in which is stored a pixel charge detected by said photodetector.

19. An imaging device as in claim 11 further comprising a plurality of frame storage registers, each frame storage register being coupled to a column of said detector cells and in parallel to said transfer register, and in which is stored a pixel charge detected by said photodetector.

20. An imaging device as in claim 11 wherein said plurality of frame storage registers comprise a first frame store, a second frame store, and a third store, each first, second, and third store being connected to said transfer registers, said frame storage registers adapted to provide at least one of the following: pixel charge serial addressing and transfer, pixel charge delay, summation, and storage.

21. An integrated circuit imaging device comprising:
an image sensor disposed on said integrated circuit and
an analog memory disposed on said integrated circuit and coupled to said image sensor, said analog memory for storing a plurality of image frames sensed by said image sensor; and
an image processor disposed on said integrated circuit and coupled to said analog memory, said image processor selects for output synchronous realtime images, synchronous image differences between two image frames sampled at different points in time, and asynchronous image difference between two image frames sampled at different points in time.

22. An integrated imaging device as in claim 21 further comprising a transform coefficient layer coupled to said image sensor for outputting a transformed image under the control of said image processor.

23. An integrated imaging device as in claim 21 further comprising an analog multiplier, an analog to digital converter, and a coding circuit for compressing said image difference to a 100:1 image compressing for motion pictures.

* * * * *